(12) United States Patent
Nag et al.

(10) Patent No.: US 12,524,054 B2
(45) Date of Patent: Jan. 13, 2026

(54) POWER LOSS PROTECTION USING THERMOELECTRIC GENERATOR

(71) Applicant: Micron Technology, Inc., Boise, ID (US)

(72) Inventors: Abhilash Ramamurthy Nag, Bangalore (IN); Shiva Pahwa, Bangalore (IN); Suresh Reddy Yarragunta, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 108 days.

(21) Appl. No.: 18/233,594

(22) Filed: Aug. 14, 2023

(65) Prior Publication Data

US 2024/0061487 A1  Feb. 22, 2024

(30) Foreign Application Priority Data

Aug. 16, 2022 (IN) .............................. 202241046430

(51) Int. Cl.
  *G06F 1/32* (2019.01)
  *G06F 1/26* (2006.01)
  *G06F 1/30* (2006.01)
  *G06F 3/06* (2006.01)

(52) U.S. Cl.
  CPC ............... *G06F 1/30* (2013.01); *G06F 1/263* (2013.01); *G06F 3/0626* (2013.01); *G06F 3/0629* (2013.01); *G06F 3/0679* (2013.01)

(58) Field of Classification Search
  CPC ........................................................ G06F 1/32
  See application file for complete search history.

(56) References Cited

U.S. PATENT DOCUMENTS

| | | | | |
|---|---|---|---|---|
| 8,069,309 B1* | 11/2011 | Long | ................... | G06F 11/1441 711/E12.075 |
| 10,432,017 B1* | 10/2019 | Morales | .............. | H02J 7/00712 |
| 10,824,363 B2* | 11/2020 | Jenne | ................... | G06F 3/0647 |
| 11,709,777 B2* | 7/2023 | Lee | ..................... | G06F 11/1441 711/118 |
| 2007/0035279 A1* | 2/2007 | Kwon | ................... | H02J 7/0048 320/132 |
| 2008/0005474 A1* | 1/2008 | Long | ................... | G06F 12/0871 711/E12.019 |
| 2009/0260668 A1* | 10/2009 | Maeda | ...................... | H02J 4/00 363/13 |
| 2011/0239043 A1* | 9/2011 | Vedder | .................. | G06F 1/3203 714/14 |
| 2012/0089854 A1* | 4/2012 | Breakstone | ......... | G06F 13/4022 713/323 |
| 2015/0293714 A1* | 10/2015 | Matsubara | .............. | G06F 3/065 711/162 |

(Continued)

*Primary Examiner* — Phil K Nguyen
(74) *Attorney, Agent, or Firm* — Schwegman Lundberg & Woessner, P.A.

(57) ABSTRACT

Aspects of the present disclosure configure a memory subsystem processor, to use a thermoelectric generator during a power loss event. The processor delivers power to a set of memory components from a power source. The processor detects a power failure event associated with the power source and, in response to detecting the power failure event, receives holdup power from the thermoelectric generator. The processor delivers the holdup power from the thermoelectric generator to the set of memory components.

20 Claims, 5 Drawing Sheets

(56) References Cited

U.S. PATENT DOCUMENTS

2016/0026783 A1* 1/2016 Buer ................. G06F 21/71
            711/103
2017/0287542 A1* 10/2017 Lin ................. G11C 29/4401
2021/0367127 A1* 11/2021 Rastegar ............... H10N 10/17

* cited by examiner

POWER LOSS PROTECTION USING THERMOELECTRIC GENERATOR

PRIORITY APPLICATION

This application claims the benefit of priority to Indian Patent Application Serial Number 202241046430, filed Aug. 16, 2022, which is incorporated herein by reference in its entirety.

TECHNICAL FIELD

Embodiments of the disclosure relate generally to memory sub-systems and, more specifically, to providing power loss management.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure configure a system component, such as a memory sub-system processor or controller, such as a power management unit or module, to detect a power failure event (e.g., if a power or voltage level being received by the memory sub-system processor or controller falls below a threshold level). In response, the memory sub-system processor or controller switches from delivering, or accessing, power from a power supply source to an alternate holdup power source to allow the memory sub-system to complete the performing of certain operations before being powered down. The holdup power source can include a thermoelectric generator (TEG), or module along with PCM for heat storage, that is physically attached to one of the memory sub-system components, such as the memory controller or memory cells. This ensures that performance of the memory system remains optimal and avoids data loss with minimal hardware additions. Particularly, a temperature difference across the TEG can be obtained from slow changing temperature of heat storage of a PCM side and rapidly changing temperature in the controller side to maximize power output during power failure. Namely, by using a TEG module to provide the holdup power in addition to or instead of one or more capacitors, physical real estate on a printed circuit board occupied by the memory sub-system can be reduced. This improves the overall efficiency of operating and implementing the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are raw memory devices combined with a local embedded controller for memory management within the same memory device package.

There are challenges in efficiently managing or performing media management operations on typical memory devices in case of power loss events. Typical memory sub-systems are implemented on a printed circuit board and include or are coupled to very large capacitors or supercapacitors ("supercaps"), referred to herein generally as capacitors. These capacitors, during normal memory operation, are charged up and hold sufficient charge to power the memory sub-system temporarily for some threshold amount of time. In case of a power loss event, the memory sub-system instantly begins discharging the capacitors to obtain backup power from the capacitors. This enables the memory sub-system to complete performing certain critical operations before being completely powered down. While these systems generally work well, the need to add these large capacitors or supercapacitors to provide the backup power consumes a great deal of physical real estate on the printed circuit boards (PCBs). As a result, fewer amount of memory components can be added which reduces the overall available storage capacity of the memory sub-systems. This can result in less than optimal use of physical real estate and wastes system resources.

Aspects of the present disclosure address the above and other deficiencies by providing TEG module that is physically attached to one or more memory components, such as a memory processor, which can supply some amount of holdup power during a power failure (loss) event. The TEG module can use the heat dissipated by the memory components, to which it is attached to generate some amount of holdup power. The amount of holdup power that the TEG module can produce can be sufficient to replace the power generated by at least one of the capacitors of typical devices. For example, the holdup power can be sufficient to allow the completion of I/O operations from the memory controller to the NAND storage components and can ensure that the data in a DRAM cache is flushed or moved to the NAND storage components. As such, the TEG module can replace at least one of the capacitors of the typical PCBs which frees up physical real estate on the PCB for other components, such as additional NAND, DRAM or other memory components or devices. This increases the efficiency of operating memory systems and reduces the amount of physical resources consumed by the memory sub-systems.

In some examples, the memory controller (or power management unit) delivers power to the set of memory components from a power source and detects a power failure event associated with the power source (e.g., a power supply of the memory sub-system). The memory controller, in response to detecting the power failure event, receives holdup power from the thermoelectric generator and delivers the holdup power from the thermoelectric generator to the set of memory components. The memory controller can include a processing device, such as a power management integrated circuit. The thermoelectric generator can replace one or more capacitors on a printed circuit board associated with the memory sub-system. One or more additional memory components can be added to the memory sub-system in an area of the printed circuit board corresponding to the one or more capacitors.

In some examples, the memory controller delivers the holdup power to a memory controller of the memory sub-system which provides the power to the memory storage elements or cells, such as the NAND or DRAM memory components.

In some examples, the system includes a memory controller. The thermoelectric generator can be physically attached to the memory controller. The system can include a heat sink. The heat sink can be physically attached to the thermoelectric generator, such that the thermoelectric generator is between the heat sink and the memory controller. The heat sink can include phase change material.

In some examples, the memory controller determines that an amount of holdup power remaining has reached a threshold. In response to determining that the amount of holdup power remaining has reached the threshold, the memory controller receives further holdup power from a holdup power source. The holdup power source can include one or more capacitors.

In some examples, the system includes a memory controller, wherein the thermoelectric generator is a first thermoelectric generator. The first thermoelectric generator can be physically attached to the memory controller. A second thermoelectric generator can be physically attached to a portion of the set of memory components. The memory controller combines power output of the first and second thermoelectric generators to generate the holdup power.

Though various embodiments are described herein as being implemented with respect to a memory sub-system (e.g., a controller of the memory sub-system), some or all of the portions of an embodiment can be implemented with respect to a host system, such as a software application or an operating system of the host system.

Figure 1:
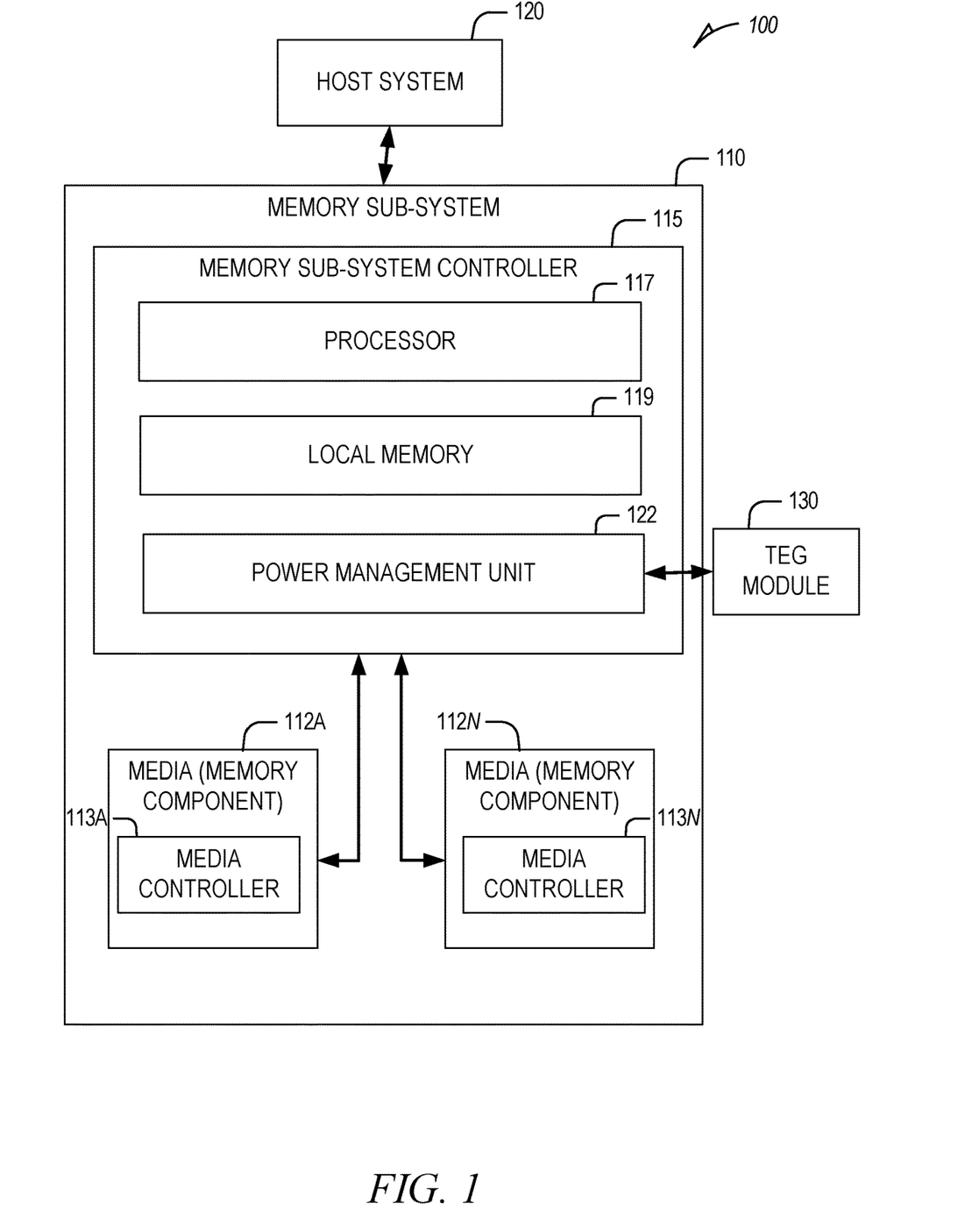
FIG. 1 is a block diagram illustrating an example computing environment including a memory sub-system, in accordance with some embodiments of the present disclosure.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120. The memory sub-system 110 can be implemented on a PCB that is coupled to the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random-access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

The memory sub-system controller 115 can include hardware such as one or more integrated circuits and/or discrete components, a power management unit 122, a TEG module 130, a buffer memory, and/or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode with instructions for the memory sub-system controller 115 to execute, such as firmware. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other memory management operations, such as wear leveling operations, garbage collection operations, error detection and error-correcting code (ECC) operations, encryption operations, caching operations, memory components 112A to 112N initialization, and/or address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120. The memory sub-system controller 115 can include a memory interface to communicate with the memory components 112A to 112N. Any component included as part of the memory sub-system controller 115 can be included in the memory interface and vice versa.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a power management unit 122 that is coupled to a TEG module 130. In some cases, the power management unit 122 can be a separate physical component from the components of the memory sub-system controller 115. In some cases, the power management unit 122 and the components of the memory sub-system controller 115 are implemented by the same physical device or integrated circuit. The TEG module 130 is a separate physical device from the power management unit 122 and/or the memory sub-system controller 115. The TEG module 130 implements a thermoelectric generator that converts heat energy into electrical energy or power. The TEG module 130 can collect heat dissipated by one or more components of the memory sub-system controller 115 and/or the memory sub-system 110, such as the memory components 112A to 112N. The TEG module 130, when activated by the power management unit 122, converts the dissipated heat it collects into electrical energy or power.

In some examples, the TEG module 130 can supply some amount of holdup power during a power failure (loss) event detected by the power management unit 122. The TEG module 130 can use the heat dissipated by the memory components to which it is attached to generate some amount of holdup power. The amount of holdup power that the TEG module can produce can be sufficient to replace the power generated by at least one of the capacitors of typical devices. For example, the holdup power can be sufficient to all the completion of I/O operations from the memory controller to the NAND storage components and can ensure that the data in a DRAM cache is flushed or moved to the NAND storage components. As such, the TEG module can replace at least one of the capacitors of the typical PCBs which frees up physical real estate on the PCB for other components, such as additional NAND, DRAM or other memory components or devices. This increases the efficiency of operating memory systems and reduces the amount of physical resources consumed by the memory sub-systems.

Depending on the embodiment, the power management unit 122 can comprise logic (e.g., a set of transitory or non-transitory machine instructions, such as firmware) or one or more components that causes the power management unit 122 to perform operations described herein. The power management unit 122 can comprise a tangible or non-tangible unit capable of performing operations described herein.

For example, the power management unit 122 can be configured to deliver power to any of the components of the memory sub-system 110. The power management unit 122 can receive power from a power supply and can route the power (after optionally adjusting a voltage of the power supply) to the processor 117, local memory 119, and/or the memory components 112A to 112N. The power management unit 122 can monitor changes in the power received from the power supply to detect a power failure or loss event. For example, the power management unit 122 can determine that the current power or voltage received from the power supply drops or falls below a threshold value. In response, the power management unit 122 can begin performing power failure operations.

In some cases, the power management unit 122 instructs the TEG module 130 to begin converting heat dissipated energy that the TEG module 130 receives into electrical energy. This causes the TEG module 130 to generate holdup power. The TEG module 130 delivers the holdup power that is generated based on the heat dissipation of the physical components to which the TEG module 130 is attached to the power management unit 122. The power management unit 122 routes the holdup power received from the TEG module 130 to one or more components of the memory sub-system 110, such as the processor 117, the local memory 119, and/or the memory components 112A to 112N. In some examples, this holdup power can be in the range of 2-3 Watts.

While the power management unit 122 delivers the holdup power to the one or more components of the memory sub-system 110, the power management unit 122 monitors the level of the holdup power. The power management unit 122 can determine that the level of the holdup power falls below a threshold value by continuously or periodically comparing the holdup power to the threshold value. The threshold value can be the same or different from the threshold value used by the power management unit 122 to detect the initial power loss or failure event.

In response to determining that that holdup power is less than the threshold value (fails to transgress or exceed the threshold value), the power management unit 122 accesses additional backup power from another power source. For example, the power management unit 122 can access power or electrical energy from one or more capacitors that are implemented as separate physical devices relative to the memory sub-system 110. In this way, the power management unit 122 can ensure that a sufficient amount of power continues to be delivered to the memory sub-system 110 (e.g., from the TEG module 130 initially and then from one or more capacitors) to allow the memory sub-system 110 to finish critical operations after a power failure or loss event is detected. By avoiding disruption of power to the memory sub-system 110 in the event of a power failure or loss, the power management unit 122 can ensure that data loss is prevented.

Figure 2:
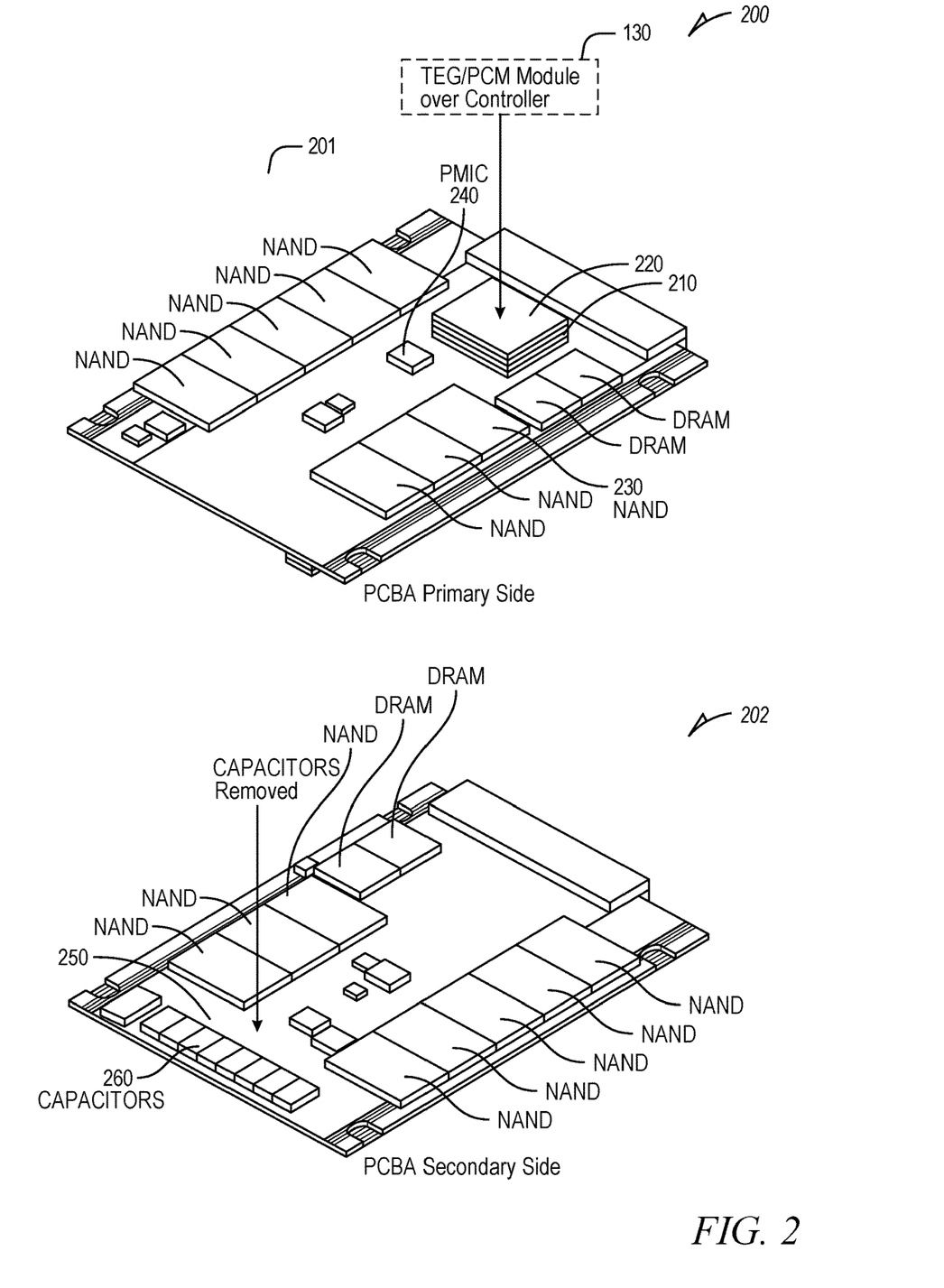
FIG. 2 is a diagram of an example physical assembly of the memory sub-system with the power management unit and TEG module, in accordance with some implementations of the present disclosure.

FIG. 2 is a diagram 200 of example physical assemblies 201 and 202 of the memory sub-system with the power management unit 122 and TEG module 130 of FIG. 1, in accordance with some implementations of the present disclosure. As shown in assembly 201, a PCB includes a plurality of storage devices, such as NAND devices 230. These NAND devices can correspond to the memory components 112A to 112N. The PCB includes a power management unit 240 which corresponds to the power management unit 122. As shown, the power management unit 240 is a separate component from a memory controller 210 (corresponding to one or more components of the memory sub-system controller 115 of FIG. 1).

In some examples, the TEG module 220 (corresponding to the TEG module 130) can be physically attached to one or more components of the memory sub-system 110 of FIG. 1. For example, the TEG module 220 can be physically attached on top of the memory controller 210. In some cases, a heat sink can be placed on top of the TEG module 220 to control the rate at which heat dissipates through the TEG module 220 which increases the amount of power the TEG module 220 generates. During a power loss event, the power management unit 240 activates the TEG module 220 or instructs the TEG module 220 to begin generating electrical energy or power based on the heat dissipated by the memory controller 210.

In some cases, the assembly 202 represents a bottom or opposite side of the PCB on which the assembly 201 is implemented. Any components shown and discussed in connection with the assembly 202 can be similarly implemented as part of the assembly 201 and vice versa. The assembly 202 includes one or more capacitors 260. As previously mentioned, in response to determining that that holdup power provided by the TEG module 220 (during a power failure or loss event) is less than the threshold value (fails to transgress or exceed the threshold value), the power management unit 122 accesses additional backup power from another power source, such as the capacitors 260. In some examples, one or more capacitors 250 can be removed from the assembly 202 in order to free up physical space for other memory sub-system 110 components, such as additional NAND or DRAM memory devices. These capacitors can be removed because the total amount of electrical energy or power produced by the TEG module 220 in the event of a power failure event, combined with the amount of power available by the remaining capacitors 260, is sufficient to power the critical memory sub-system components 110 long enough to complete critical memory operations. Namely, the quantity of capacitors that can be removed from the PCB (assembly 202) can correspond to the amount of power that the TEG module 220 can produce or is expected to produce. This can be a function of the expected amount of heat that is dissipated by the component(s) over which the TEG module 220 is attached.

In some examples, a second TEG module 220 (not shown) can be physically attached to another memory sub-system component, such as the one or more NAND devices 230. In such implementations, a first TEG module 220 is physically attached on top of or adjacent to the memory controller 210 and the second TEG module 220 is physically attached on top of or adjacent to the one or more NAND devices 230. In this configuration, each of the first and second TEG modules 220 can convert heat dissipated by the component to which the TEG module 220 is attached to electrical energy or power and provides the electrical energy or power to the power management unit 240. The power management unit 240 can combine the electrical energy or power provided by each of the first and second TEG modules 220 to provide power to other memory components during a power failure or loss event. In some cases, the power management unit 240 can initially access power from the second TEG module 220 and then, once power from the second TEG module 220 is depleted or falls below a threshold, the power management unit 240 accesses power from the first TEG module 220. In some other examples, the power management unit 240 can initially access power from the first TEG module 220 and then, once power from the first TEG module 220 is depleted or falls below a threshold, the power management unit 240 accesses power from the second TEG module 220. Any number of additional TEG modules 220 can be provided and the energy from such TEG modules 220 can be aggregated or combined in the event of a power loss or failure in a similar manner.

Figure 3:
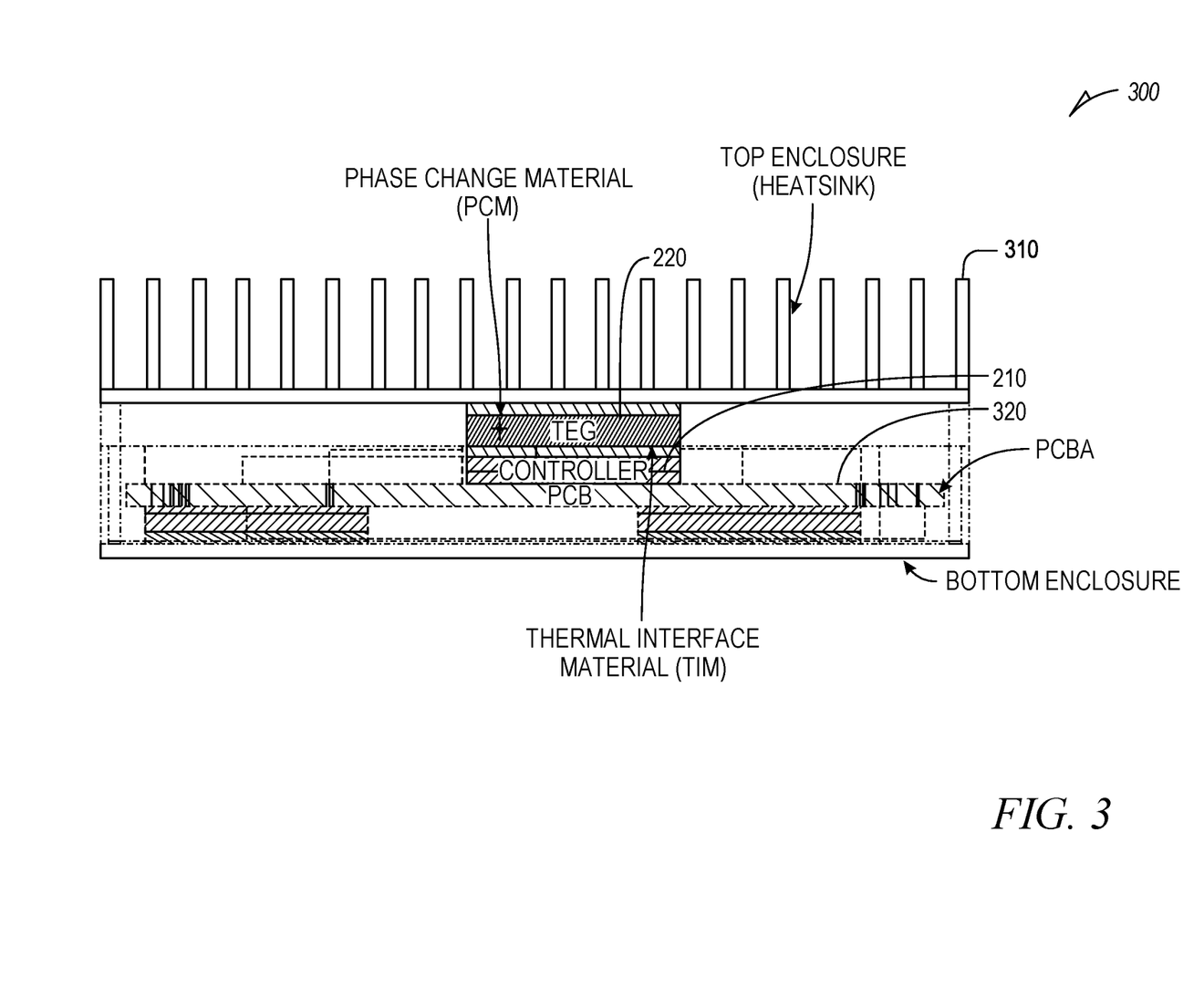
FIG. 3 is a block diagram of an example physical assembly of the memory controller with the TEG module and PCM (phase change material), in accordance with some implementations of the present disclosure.

FIG. 3 is a block diagram of an example physical assembly 300 of the memory controller with the TEG module, in accordance with some implementations of the present disclosure. In some examples, the physical assembly 300 represents a cross section of the assembly 201 (not shown) of FIG. 2. Specifically, the physical assembly 300 can include the memory controller 210 and the TEG module 220. The physical assembly 300 includes a heat sink 310, such as a phase change material, on top of the TEG module 220. This can control the rate at which heat is dissipated and collected by the TEG module 220 to allow a greater amount or duration of power to be generated by and delivered from the TEG module 220 to the power management unit 240 (not shown) of FIG. 2. Specifically, the heat sink 310 prevents a drastic temperature change from being dissipated through the TEG module 220. This ensures efficiency in conversion of heat to electrical energy or power by the TEG module 220 during a power loss or failure event by maximizing the temperature difference across the TEG module 220 due to the ability to store heat without altering the peak temperature.

As shown in the physical assembly 300, the heat sink 310, the TEG module 220, and the memory controller 210 are placed on top of a PCB 320.

Figure 4:
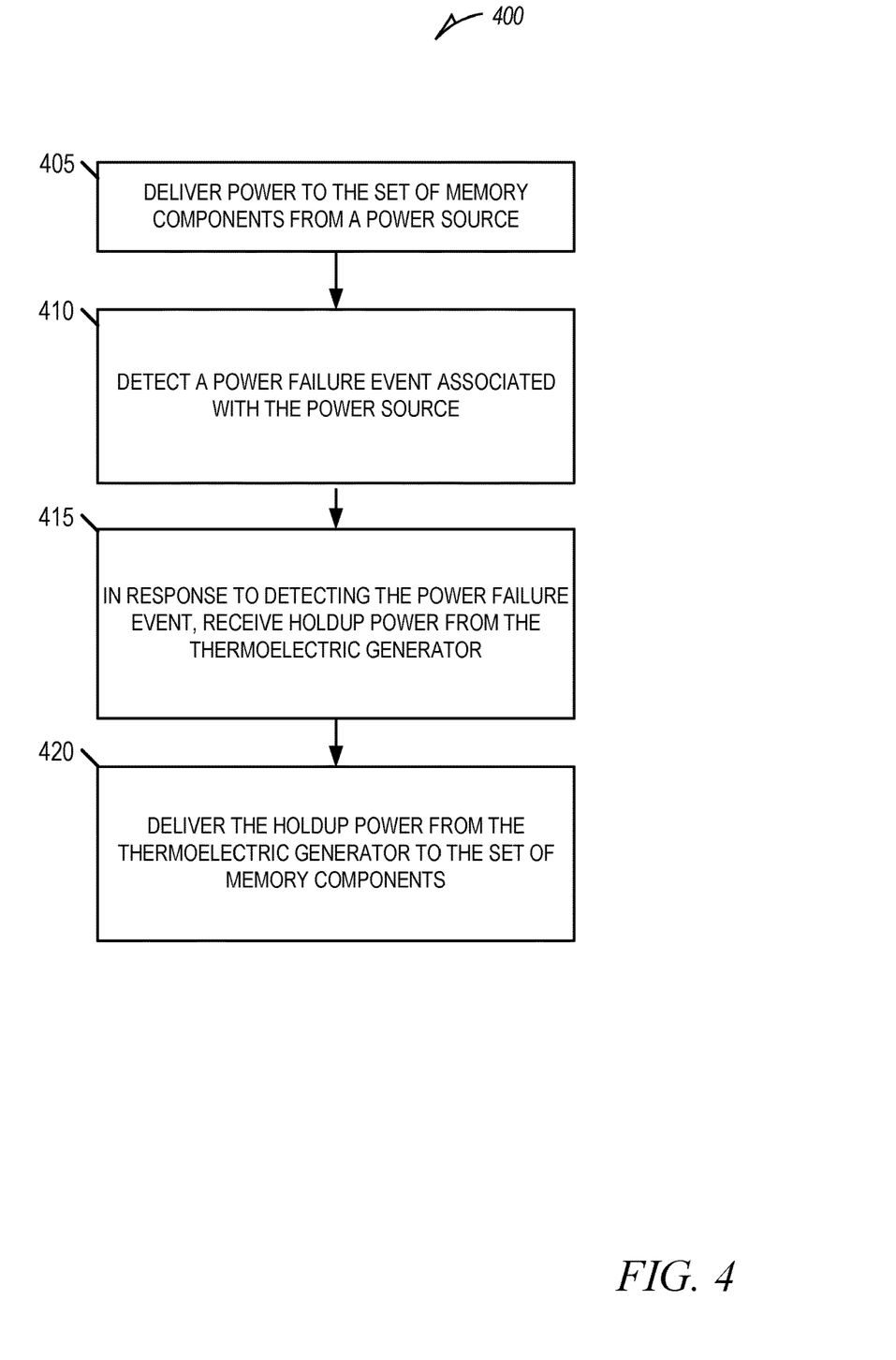
FIG. 4 is a flow diagram of an example method to perform power management, in accordance with some implementations of the present disclosure.

FIG. 4 is a flow diagram of an example method 400 to perform power management, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 400 is performed by the power management unit 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 4, the method (or process) 400 begins at operation 405, with a power management unit 122 of a memory sub-system (e.g., memory sub-system 110) delivering power from a power source to the set of memory components 112A to 112N. Then, at operation 410, the power management unit 122 of a memory sub-system (e.g., memory sub-system 110) detects a power failure event associated with the power source. The power management unit 122 of a memory sub-system (e.g., memory sub-system 110), at operation 415, in response to detecting the power failure event, receives holdup power from a thermoelectric generator, such as the TEG module 130. At operation 420, power management unit 122 of a memory sub-system (e.g., memory sub-system 110) delivers the holdup power from the thermoelectric generator to the set of memory components 112A to 112N.

In view of the disclosure above, various examples are set forth below. It should be noted that one or more features of an example, taken in isolation or combination, should be considered within the disclosure of this application.

Example 1: a system comprising: a set of memory components of a memory sub-system; a thermoelectric generator; and a processing device operatively coupled to the set of memory components, the processing device being configured to perform operations comprising: delivering power to the set of memory components from a power source; detecting a power failure event associated with the power source; in response to detecting the power failure event, receiving holdup power from the thermoelectric generator; and delivering the holdup power from the thermoelectric generator to the set of memory components.

Example 2: the system of Example 1 wherein the operations comprise: delivering the holdup power to a memory controller of the memory sub-system.

Example 3: the system of Examples 1 or 2, wherein the processing device comprises a power management integrated circuit.

Example 4: the system of any one of Examples 1-3, wherein the system comprises a memory controller, and wherein the thermoelectric generator is physically attached to the memory controller.

Example 5: the system of Example 4, wherein the system comprises a heat sink, and wherein the heat sink is physically attached to the thermoelectric generator, such that the thermoelectric generator is between the heat sink and the memory controller.

Example 6: the system of Example 5, wherein the heat sink comprises phase change material.

Example 7: the system of any one of Examples 1-6, wherein the operations comprise: determining that an amount of holdup power remaining has reached a threshold; and in response to determining that the amount of holdup power remaining has reached the threshold, receiving further holdup power from a holdup power source.

Example 8: the system of Example 7, wherein the holdup power source comprises one or more capacitors.

Example 9: the system of any one of Examples 1-8, wherein the system comprises a memory controller, wherein the thermoelectric generator is a first thermoelectric generator, wherein the first thermoelectric generator is physically attached to the memory controller, and wherein a second thermoelectric generator is physically attached to a portion of the set of memory components.

Example 10: the system of Example 9, wherein the operations comprise: combining power output of the first and second thermoelectric generators to generate the holdup power.

Example 11: the system of any one of Examples 1-10, wherein the thermoelectric generator replaces one or more capacitors on a printed circuit board associated with the memory sub-system.

Example 12: the system Example 11, wherein one or more additional memory components are added to the memory sub-system in an area of the printed circuit board corresponding to the one or more capacitors.

Example 13: the system of any one of Examples 1-12, wherein the power source comprises a power supply of the memory sub-system.

Methods and computer-readable storage medium with instructions for performing any one of the above examples.

Figure 5:
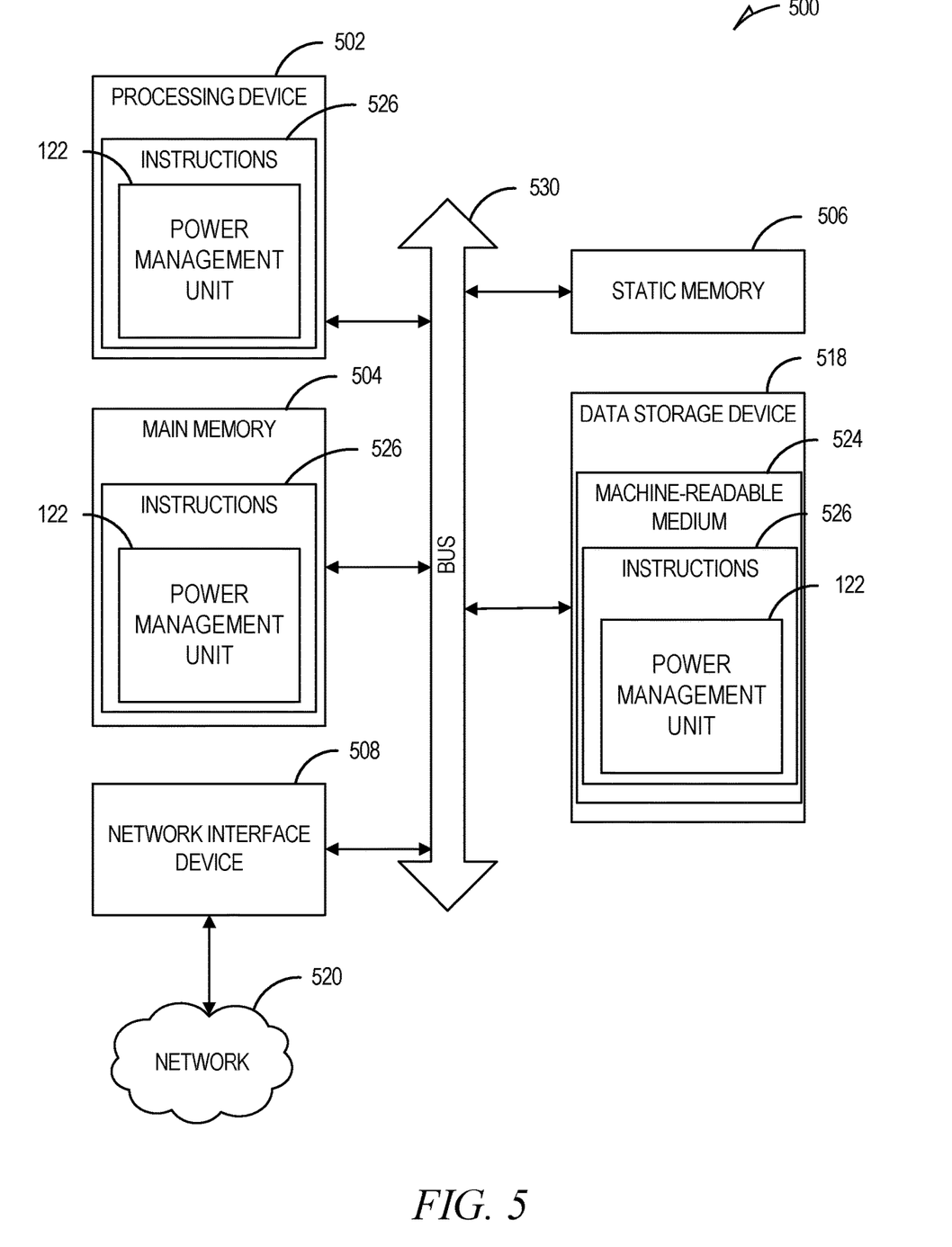
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the power management unit 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526, or software embodying any one or more of the methodologies or functions described herein. The instructions 526 can also reside, completely or partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 implement functionality corresponding to the power management unit 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a set of memory components of a memory sub-system;
   a first thermoelectric generator;
   a processing device operatively coupled to the first thermoelectric generator and the set of memory components, the processing device being programmed to perform operations comprising:
   delivering power to the set of memory components from a power source;
   detecting a power failure event associated with the power source;
   in response to detecting the power failure event, receiving holdup power from a first type of power source comprising the first thermoelectric generator;
   delivering the holdup power from the first thermoelectric generator to the set of memory components; and
   in response to determining that an amount of holdup power remaining in the first type of power source fails to transgress a threshold, delivering further holdup power to the set of memory components from a second type of power source comprising one or more capacitors, the first thermoelectric generator being physically attached to a surface of a memory controller comprising the processing device; and
   a second thermoelectric generator that is physically attached to a surface of a portion of the set of memory components, the holdup power being delivered from the first and the second thermoelectric generators that are placed on surfaces of different types of components of the memory sub-system.

2. The system of claim 1, wherein the operations comprise:
   delivering the holdup power to the memory controller of the memory sub-system.

3. The system of claim 1, wherein the processing device comprises a power management integrated circuit.

4. The system of claim 1, wherein the first thermoelectric generator is physically attached to the memory controller.

5. The system of claim 4, wherein the system comprises a heat sink, and wherein the heat sink is physically attached to the first thermoelectric generator, such that the first thermoelectric generator is between the heat sink and the memory controller.

6. The system of claim 5, wherein the heat sink comprises phase change material.

7. The system of claim 1, wherein first thermoelectric generator is disposed on a first side of a printed circuit board, and wherein the one or more capacitors are disposed on a second side of the printed circuit board opposite to the first side.

8. The system of claim 1, wherein the first thermoelectric generator is placed between the surface of the memory controller and a heat sink, the first thermoelectric generator having a first width, and wherein the heat sink has a second width that is greater than the first width of the first thermoelectric generator, the heat sink being placed to control a rate at which heat is dissipated and collected by the first thermoelectric generator.

9. The system of claim 1, wherein the system comprises a memory controller, wherein the first thermoelectric generator is physically attached to the memory controller, and wherein the second thermoelectric generator is physically attached to a portion of the set of memory components.

10. The system of claim 1, wherein the operations comprise:
combining power output of the first and second thermoelectric generators to generate the holdup power.

11. The system of claim 1, wherein one or more additional memory components are added to the memory sub-system in an area of a printed circuit board corresponding to one or more other capacitors.

12. The system of claim 1, wherein the power source comprises a power supply of the memory sub-system.

13. A method comprising:
delivering power to a set of memory components from a power source;
detecting a power failure event associated with the power source;
in response to detecting the power failure event, receiving holdup power from a first type of power source comprising a first thermoelectric generator;
delivering the holdup power from the first thermoelectric generator to the set of memory components; and
in response to determining that an amount of holdup power remaining in the first type of power source fails to transgress a threshold, delivering further holdup power to the set of memory components from a second type of power source comprising one or more capacitors, the first thermoelectric generator being physically attached to a surface of a memory controller, a second thermoelectric generator being physically attached to a surface of a portion of the set of memory components, the holdup power being delivered from the first and the second thermoelectric generators that are placed on surfaces of different types of components of a memory sub-system.

14. The method of claim 13, further comprising:
delivering the holdup power to a memory controller of a memory sub-system.

15. The method of claim 13, wherein the first thermoelectric generator is placed between a surface of a memory controller and a heat sink, the first thermoelectric generator having a first width, and wherein the heat sink has a second width that is greater than the first width of the first thermoelectric generator, the heat sink being placed to control a rate at which heat is dissipated and collected by the first thermoelectric generator.

16. A non-transitory computer-readable storage medium comprising instructions that, when executed by a processing device, cause the processing device to perform operations comprising:
delivering power to a set of memory components from a power source;
detecting a power failure event associated with the power source;
in response to detecting the power failure event, receiving holdup power from a first type of power source comprising a first thermoelectric generator;
delivering the holdup power from the first thermoelectric generator to the set of memory components; and
in response to determining that an amount of holdup power remaining in the first type of power source fails to transgress a threshold, delivering further holdup power to the set of memory components from a second type of power source comprising one or more capacitors, the first thermoelectric generator being physically attached to a surface of a memory controller, a second thermoelectric generator being physically attached to a surface of a portion of the set of memory components, the holdup power being delivered from the first and the second thermoelectric generators that are placed on surfaces of different types of components of a memory sub-system.

17. The non-transitory computer-readable storage medium of claim 16, wherein the first thermoelectric generator is placed between a surface of a memory controller and a heat sink, the first thermoelectric generator having a first width, and wherein the heat sink has a second width that is greater than the first width of the first thermoelectric generator, the heat sink being placed to control a rate at which heat is dissipated and collected by the first thermoelectric generator.

18. The non-transitory computer-readable storage medium of claim 16, wherein the operations comprise:
delivering the holdup power to the memory controller of the memory sub-system.

19. The non-transitory computer-readable storage medium of claim 16, wherein the first thermoelectric generator is physically attached to the memory controller.

20. The non-transitory computer-readable storage medium of claim 16, wherein the memory sub-system comprises a heat sink, and wherein the heat sink is physically attached to the first thermoelectric generator, such that the first thermoelectric generator is between the heat sink and the memory controller.

* * * * *